United States Patent
Peng et al.

(10) Patent No.: US 12,410,807 B2
(45) Date of Patent: Sep. 9, 2025

(54) METHOD FOR CONTROLLING DRAUGHT FAN, AND DRAUGHT FAN DEVICE

(71) Applicants: HEFEI MIDEA HEATING & VENTILATING EQUIPMENT CO., LTD., Hefei (CN); GD MIDEA HEATING & VENTILATING EQUIPMENT CO., LTD., Foshan (CN)

(72) Inventors: Guobin Peng, Hefei (CN); Mingsheng Zhong, Hefei (CN); Haohao Wang, Hefei (CN)

(73) Assignees: HEFEI MIDEA HEATING & VENTILATING EQUIPMENT CO., LTD., Hefei (CN); GD MIDEA HEATING & VENTILATING EQUIPMENT CO., LTD., Foshan (CN)

( * ) Notice: Subject to any disclaimer, the term of this patent is extended or adjusted under 35 U.S.C. 154(b) by 256 days.

(21) Appl. No.: 18/550,462

(22) PCT Filed: Jan. 4, 2022

(86) PCT No.: PCT/CN2022/070147
§ 371 (c)(1),
(2) Date: Sep. 14, 2023

(87) PCT Pub. No.: WO2022/193799
PCT Pub. Date: Sep. 22, 2022

(65) Prior Publication Data
US 2024/0159241 A1    May 16, 2024

(30) Foreign Application Priority Data
Mar. 16, 2021 (CN) .......................... 202110280245.4

(51) Int. Cl.
*F04D 27/00* (2006.01)

(52) U.S. Cl.
CPC .................................. *F04D 27/004* (2013.01)

(58) Field of Classification Search
CPC ...... F04D 15/00; F04D 15/0066; F04D 27/00; F04D 27/004; F24F 11/62–64
See application file for complete search history.

(56) References Cited

U.S. PATENT DOCUMENTS

| 10,690,138 B2 | 6/2020 | Sasaki et al. | |
| 2015/0233380 A1* | 8/2015 | Sasaki et al. | F04D 27/004 318/474 |

FOREIGN PATENT DOCUMENTS

| CN | 102315809 A | 1/2012 |
| CN | 103809437 A | 5/2014 |

(Continued)

OTHER PUBLICATIONS

International Search Report received in PCT/CN2022/070147; mailed Mar. 1, 2022.

(Continued)

*Primary Examiner* — Mark A Laurenzi
*Assistant Examiner* — Chirag Jariwala
(74) *Attorney, Agent, or Firm* — K&L Gates LLP

(57) ABSTRACT

A method and for controlling a draught fan including: obtaining an actual rotating speed, an actual power, and a target air volume of the draught fan, obtaining a target power corresponding to the target air volume according to the actual rotating speed and the target air volume, obtaining, in response to a power difference value between the actual power and the target power being not within an initial difference value range, a control duration and a rotating speed step size corresponding to the power difference value, and adjusting the actual rotating speed according to the rotating speed step size after the control duration. A dynamic adjustment of the air volume of the draught fan is achieved, and a constant air volume control of the draught fan with low (Continued)

cost, high control accuracy, fast adjustment speed and good stability is achieved.

19 Claims, 7 Drawing Sheets

(56) References Cited

FOREIGN PATENT DOCUMENTS

| | | | | |
|---|---|---|---|---|
| CN | 104180858 A | * | 12/2014 | ............... G01F 1/00 |
| CN | 104764160 A | | 7/2015 | |
| CN | 106152392 A | | 11/2016 | |
| CN | 107388502 A | * | 11/2017 | ............ F24F 1/0007 |
| CN | 109357382 A | | 2/2019 | |
| CN | 109442693 A | * | 3/2019 | .............. F24F 11/64 |
| CN | 111059736 A | | 4/2020 | |
| CN | 111207098 A | | 5/2020 | |
| CN | 112901547 A | | 6/2021 | |
| DE | 102015012462 B3 | | 3/2017 | |
| JP | 2013189953 A | | 9/2013 | |
| WO | 2016011618 A1 | | 1/2016 | |
| WO | 2019091619 A1 | | 5/2019 | |

OTHER PUBLICATIONS

First Office Action received in 202110280245.4; mailed May 31, 2022.
ESR Received in EP Application No. 22770161.2; mailed Jul. 2, 2024.

* cited by examiner

| Preset air volume (m³/h) | Preset rotating speed (RPM) | Static pressure (Pa) | Powers (0.01W) | | | Average value of powers |
| --- | --- | --- | --- | --- | --- | --- |
| 1620 | 1000 | -4.7 | 6570 | 6530 | 6590 | 6563 |
| | 1400 | 47.6 | 11590 | 11650 | 11700 | 11647 |
| | 1600 | 80.1 | 15050 | 14920 | 15150 | 15020 |
| 1400 | 900 | -3.7 | 4670 | 4660 | 4770 | 4700 |
| | 1300 | 44 | 8790 | 8840 | 8900 | 8843 |
| | 1500 | 75 | 11600 | 11720 | 11550 | 11623 |
| 1180 | 800 | -1.9 | 3210 | 3220 | 3190 | 3207 |
| | 1200 | 40.8 | 6600 | 6610 | 6450 | 6583 |
| | 1400 | 69.3 | 8860 | 8960 | 8840 | 8887 |

FIG. 4

| Preset air volume (m³/h) | Preset rotating speed (RPM) | Static pressure (Pa) | Power efficient |
|---|---|---|---|
| 1620 | 1000 | -4.7 | 0.293 |
| | 1400 | 47.6 | 0 |
| | 1600 | 80.1 | 1.819 |
| 1400 | 900 | -3.7 | 0.272 |
| | 1300 | 44 | 0 |
| | 1500 | 75 | 1.754 |
| 1180 | 800 | -1.9 | 0.244 |
| | 1200 | 40.8 | 0 |
| | 1400 | 69.3 | 1.772 |

FIG. 5

| Preset measurement air volume (m³/h) | Preset measurement static pressure (Pa) | Actually measured air volume (m³/h) | Accuracy of air volume (%) |
|---|---|---|---|
| 1620 | 0 | 1621 | 0.06 |
| | 40 | 1630 | 0.62 |
| | 80 | 1629 | 0.56 |
| 1400 | 0 | 1411 | 0.79 |
| | 40 | 1381 | -1.36 |
| | 80 | 1379 | -1.5 |
| 1180 | 0 | 1147 | -2.8 |
| | 40 | 1173 | -0.08 |
| | 80 | 1219 | 3.31 |

METHOD FOR CONTROLLING DRAUGHT FAN, AND DRAUGHT FAN DEVICE

CROSS-REFERENCES TO RELATED APPLICATIONS

The present disclosure is a national phase application of International Application No. PCT/CN2022/070147, filed on Jan. 4, 2022, which claims priority to Chinese patent application No. 2020110280245.4 filed on Mar. 16, 2021, the entire contents of which are incorporated herein by reference.

FIELD

The present application relates to the field of draught fan technologies, and more particularly, to a method for controlling a draught fan, and a draught fan device.

BACKGROUND

A draught fan is a mechanical device that uses input mechanical energy to increase gas pressure and to exhaust gas, and it is widely used in draught fan devices such as air conditioners, ventilation devices, blowers, and wind-driven generators. It is usually necessary to achieve a constant air volume control during an operating process of the draught fan. In some existing technologies, the constant air volume control is realized by directing mounting an anemometer or a static pressure sensor, which is costly and has a control failure risk caused due to malfunction of the anemometer or the static pressure sensor. Constant air volume control methods without anemometers are used in some other technologies, which may result in a huge calculated amount or an inability to dynamically adjust the air volume in real-time.

SUMMARY

The embodiments of the present application are to provide a method for controlling a draught fan, and a draught fan device, which can dynamically adjust the air volume of the draught fan to realize the constant air volume control without the need of mounting an anemometer and a static pressure sensor. The method for controlling the draught fan, and the draught fan device have a low cost, a higher control accuracy and a good stability.

In order to solve the aforesaid problem, the embodiments used in the embodiments of the present application are as follows:

In accordance with the embodiments of the present application, a method for controlling a draught fan is provided, The method is performed by a draught fan device and includes:
- obtaining an actual rotating speed, an actual power, and a target air volume of the draught fan;
- obtaining a target power corresponding to the target air volume according to the actual rotating speed and the target air volume;
- obtaining, in response to a power difference value between the actual power and the target power being not within an initial difference value range, a control duration and a rotating speed step size corresponding to the power difference value; and
- adjusting the actual rotating speed according to the rotating speed step size, after the control duration.

In accordance with the embodiments of the present application, a draught fan device is provided. The draught fan device includes a draught fan, a memory, a processor, and a computer program stored in the memory and executable by the processor. The processor is configured to implement, when executing the computer program, steps of the method for controlling the draught fan according to the embodiments of the present application.

In accordance with the embodiments of the present application, a non-transitory computer-readable storage medium is provided. The non-transitory computer-readable storage medium stores a computer program. When the computer program is executed by a processor, the processor is configured to implement the steps of the method for controlling the draught fan according to the embodiments of the present application.

According to the method for controlling a draught fan according to the embodiments of the present application, by performing steps of obtaining the actual rotating speed, the actual power, and the target air volume of the draught fan; obtaining the target power corresponding to the target air volume according to the actual rotating speed and the target air volume, obtaining the control duration and the rotating speed step size corresponding to the power difference value when the power difference value between the actual power and the target power is not within the initial difference value range, and adjusting the actual rotating speed according to the rotating speed step size after the control duration, and the actual rotating speed can be adjusted by a certain control duration and a certain rotating speed step size according to the actual rotating speed, the actual power, and the target air volume of the draught fan without the need of mounting the anemometer and the static pressure sensor. The real-time dynamic adjustment of the air volume of the draught fan is achieved, and the constant air volume control of the draught fan with low cost, high control accuracy, fast adjustment speed and good stability is achieved.

It may be understood that, regarding the beneficial effects of the embodiments, reference can be made to the relevant descriptions in the embodiments. The beneficial effects of the embodiments are not repeatedly described herein.

BRIEF DESCRIPTION OF THE DRAWINGS

In order to describe the embodiments of the present application more clearly, a brief introduction regarding the accompanying drawings needed to be used for describing the embodiments or the related art is given below. The accompanying drawings described below are only some embodiments of the present application.

FIG. 4 illustrates powers of the draught fan respectively rotating with three different preset air volumes according to one embodiment of the present application;

FIG. 5 illustrates power coefficients corresponding to the three different preset air volumes according to one embodiment of the present application;

DETAILED DESCRIPTION OF THE DISCLOSURE

Figure 1:
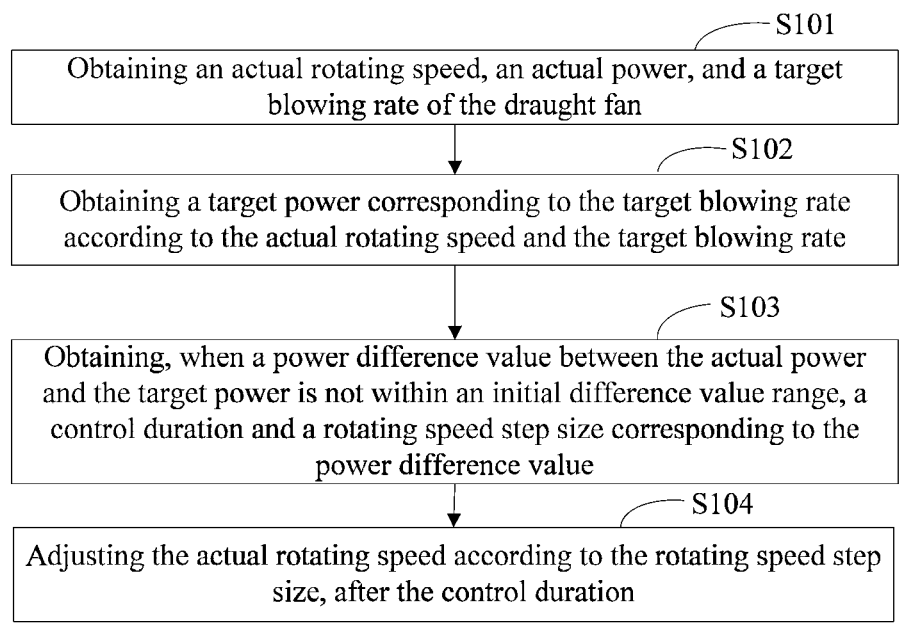
FIG. 1 illustrates a first schematic flow diagram of a method for controlling a draught fan according to one embodiment of the present application.

In the following descriptions, in order to describe but not intended to limit the present application, concrete details including specific system structure and technique are proposed to facilitate a comprehensive understanding of the embodiments of the present application. However, the present application may also be implemented in some other embodiments from which these concrete details are excluded. In other conditions, detailed explanations of method, circuit, device and system well known to the public are omitted, and unnecessary details which are disadvantageous to understanding of the description of the present application may be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including the combinations thereof.

As is used in the description and the annexed claims, a term "if" may be interpreted as "when" or "once" or "in response to determination" or "in response to detection". Similarly, terms such as "if it is determined that", or "if a described condition or event is detected" may be interpreted as "once it is determined" or "in response to the determination" or "once the described condition or event is detected" or "in response to the detection of the described condition or event".

In addition, in the descriptions of the present application, terms such as "first" and "second", "third", etc., are only used for distinguishing purpose in description, but shouldn't be interpreted as indication or implication of a relative importance.

The descriptions of "referring to one embodiment" or "referring to some embodiments", or the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless otherwise they are specially emphasize in other manner. The terms "comprising", "including", "having" and the variations thereof mean "including but is not limited to", unless otherwise they are specially emphasized in other manners.

A method for controlling a draught fan is provided in the embodiments of the present application. This method may be performed by a processor of a draught fan device by executing the corresponding computer program, and this method aims at realizing real-time dynamic adjustment of the air volume of the draught fan without the need of mounting an anemometer and a static pressure sensor, to achieve a constant air volume control. The draught fan device may be an air conditioner, a ventilation device, a blower, a wind-driven generator, etc.

As shown in FIG. 1, the method for controlling the draught fan according to the embodiments of the present application includes the following steps S101-S104:

In a step of S101, an actual rotating speed, an actual power, and a target air volume of a draught fan is obtained.

In one embodiment, during the operation of the draught fan, the actual rotating speed and the actual power of the draught fan at the current time is obtained. In particular, the actual rotating speed and the actual power of the draught fan may be obtained in real-time or be obtained once at a first preset time interval. The target air volume is the expected air volume that can be achieved by the draught fan and is set by the user. The first preset time and the target air volume may be set by the user according to the actual requirement by inputting corresponding instructions through a human-machine interaction device of the draught fan device, or by sending a corresponding instruction to the draught fan device through a user terminal connected in communication with the draught fan device.

In one embodiment, a human-computer interaction device of the draught fan device may include at least one of a physical button, a touch sensor, a gesture recognition sensor and a speech recognition device, and the user is enabled to input instructions through a corresponding touch method, a gesture control method or a voice control method.

In one embodiment, the physical button and the touch sensor may be arranged at any position of the draught fan device, such as a control panel. The specific touch method for the physical button may be pressing or toggling. The specific touch method for the touch sensor may be pressing or touching.

In one embodiment, the gesture recognition sensor may be set arranged at any position of a periphery of a housing of the draught fan device. Gestures used for controlling the draught fan device may be customized by the user according to the actual requirement or use the factory default settings.

In one embodiment, the speech recognition device may include a microphone and a speech recognition chip. In one embodiment, the speech recognition device may only include a microphone and is implemented by the processor of the draught fan device to implement speech recognition function. The speech used for controlling the draught fan device may be customized by the user according to the actual requirement or use the factory default settings.

In one embodiment, the user terminal may be a mobile phone, a smart bracelet, a tablet, a laptop, a netbook, a personal digital assistant (PDA) and other electronic device that possesses wireless communication function and can communicate with the draught fan device wirelessly. The specific types of the user terminal are not limited in the embodiments of the present application. The user may control the user terminal to send instructions to the draught fan device through any human-machine interaction method supported by the user terminal. The human-machine interaction method supported by the user terminal may be the same as that of the draught fan device, and will not be repeatedly described herein.

In one embodiment, the actual power may be calculated through software methods without the need for additional arranging a power detection device or power detection circuit in the draught fan device. In particular, the actual power may be calculated according to a voltage, a current, a phase current, and a phase resistance of a synchronous rotating coordinate system of the draught fan at the actual rotating speed.

In one embodiment, a calculation formula for the actual power of the draught fan rotating with each actual rotating speed is:

$$P\_real=1.5(Ud\_real*Id\_real+Uq\_real*Iq\_real)-3*Rs\_real*Is\_real^2 \quad \text{(first formula)}$$

P_Real represents the power of the draught fan rotating with the actual rotating speed, Ud_Real represents a d-axis voltage of the draught fan rotating with the actual rotating speed, Uq_Real represents a q-axis voltage of the draught fan rotating with the actual rotating speed, Id_Real represents a d-axis current of the draught fan rotating with the actual rotating speed, Iq_Real represents a q-axis current of the draught fan rotating with the actual rotating speed, Is_Real represents a phase current of the draught fan rotating with the actual rotating speed, Rs_Real represents a phase resistance of the draught fan rotating with the actual rotating speed.

In one embodiment, a mathematical calculation formula for the actual power is the first formula. When calculating the actual power of the draught fan rotating with other actual rotating speed, said actual power is calculated by using the first formula and according to the voltage, the current, the phase current, and the phase resistance of the draught fan rotating with said other actual rotating speed.

In a step of S102, a target power corresponding to the target air volume is obtained according to the actual rotating speed and the target air volume.

In one embodiment, the target power may be obtained in advance according to a relational expression between power, air volume, and speed of the draught fan at different preset air volumes obtained through a small amount of experimental data. In particular, the powers of the draught fan operating at multiple different preset rotating speeds at a certain preset air volume may be obtained through testing in advance. Then, a curve fitting is performed on these multiple different preset rotating speeds and the powers of the draught fan operating at the multiple different preset rotating speeds to solve a pre-established fitting equation related to the power, the speed and the air volume, to determine a power coefficient corresponding to one certain preset air volume in the fitting equation. Similarly, the power coefficients corresponding to other preset air volumes in the fitting equation may be determined. Due to the fitting equation related to the power, the speed, and the air volume and the power coefficients corresponding to the preset air volumes are known parameters uniquely determined through a small amount of experimental data in advance. Thus, with regard to each preset air volume, by only obtaining the preset rotating speed of the draught fan at each preset air volume, the powers of the draught fan rotating with the multiple preset air volumes may be calculated according to the fitting equation, the power coefficient, the air volume, and the rotating speed.

In one embodiment, a calculation formula for the target power is as follows:

$$P\_ref=k1\_ref*Q\_ref*V\_real+k2\_ref*Q\_ref^2+k3\_ref*V\_real^3 \quad \text{(second formula)}$$

P_Ref represents the target power, V_Real represents the actual rotating speed, Q_Ref represents the target air volume, k1_ref, k2_ref and k3_ref represents the power coefficients corresponding to the target air volumes Q_ref.

In one embodiment, a mathematical expression of the calculation formula for the target power is the second formula. When calculating the power of the draught fan at the preset air volume and the preset rotating speed, it only needs to replace the power coefficient with the power coefficient corresponding to the preset air volume, and replace the target air volume and the actual rotating speed with the preset air volume and the preset rotating speed.

In a step of S103, a control duration and a rotating speed step size corresponding to the power difference value are obtained in response to a power difference value between the actual power and the target power being not within an initial difference value range.

In one embodiment, after the target power is obtained, the actual power is compared with the target power. When the power difference value between the actual power and the target power is greater (i.e. the power difference value is not within the initial difference value range), the actual rotating speed of the draught fan at the current moment needs to be adjusted to modulate the actual power of the draught fan, in order that the actual power approximates to or is equal to the target power to achieve the adjustment of the actual air volume of the draught fan, and the actual air volume of the draught fan approximates to or is equal to the target air volume.

In one embodiment, when the power difference value between the actual power and the target power is small (i.e. the power difference value is located within the initial difference value range), it indicates that the actual air volume of the draught fan at the current moment approximates to or is equal to the target air volume, and thus there is no need to adjust the actual rotating speed of the draught fan at the current moment. In this condition, the actual rotating speed of the draught fan may be kept unchanged. When the target air volume set by the user is changed, the method for controlling a draught fan is performed again.

In one embodiment, after the step of S102, the method further includes:

When the power difference value between the actual power and the target power is located within the initial difference value range, step S101 is returned to be executed.

In one embodiment, the initial difference value range can be set by the user by inputting corresponding instructions through the human-machine interaction device of the draught fan device according to the actual requirement, or by sending a corresponding instruction to the draught fan device through the user terminal connected in communication to the draught fan device. For example, the initial difference value range ranges from −A*target air volume to +A*target air volume, where the value of A is determined by a control accuracy requirement for constant air volume control of the draught fan, the higher the control accuracy, the smaller the value of A. For example, A=5%, which indicates that the control accuracy is 5%. After realizing constant air volume control of the draught fan, the actual air volume of the draught fan may be adjusted to be deviated from the target air volume and a deviation value is located within −5% and +5%.

In one embodiment, an absolute value of the power difference value is negatively correlated with the control duration and is positively correlated with the rotating speed step size.

In one embodiment, the control duration and the rotating speed step size are set according to the absolute value of the power difference value. The control duration determines an adjustment speed of the actual rotating speed, and the rotating speed step size determines an adjustment step size of the actual rotating speed. The greater the absolute value of the power difference value, the greater the deviation value between the target air volume and the actual air volume. Thus, the control duration needs to be set to be shorter to accelerate the adjustment speed of the rotating speed. The rotating speed step size needs to be arranged to be greater to increase the step size for adjustment of the rotating speed. Thus, the adjustment speed for rotating speed can be improved, the adjustment speed for the air volume can be improved accordingly, the actual air volume can be adjusted to the target air volume quickly, and the speed for constant air volume control can be ultimately improved.

In one embodiment, the specific method for obtaining the control duration and the rotating speed step size corresponding to the power difference value in the step of S102 is described below:
  a target different value range which the power difference value is located within is determined;
  the control duration and the rotating speed step size corresponding to the power difference value is obtained according to the target difference value range.

In one embodiment, when the power difference value is not within the initial difference value range, the power difference value may be further compared with upper and lower limit values of multiple preset difference value ranges to determine the target difference value range which the power difference value is located within (the target difference value range is one of the preset multiple difference value ranges). Due to the preset control duration and the rotating speed step size corresponding to the preset multiple difference value ranges, when the target difference value range which the power difference value is located within is determined, the control duration and the rotating speed step size corresponding to the target difference value range may be directly used as the control duration and the rotating speed step size corresponding to the power difference value. The initial difference value range may be one of the multiple preset difference value ranges, and the control duration and the rotating speed step size corresponding to the initial difference value range are empty or 0. That is, when the power difference value is located within the initial difference value range, the actual rotating speed is not adjusted. The preset difference range may be set by the user according to the actual requirement by inputting the corresponding instruction through the human-machine interaction device of the draught fan device, or by sending the corresponding instruction to the draught fan device through the user terminal connected in communication with the draught fan device.

In a step of S104, the actual rotating speed is adjusted according to the rotating speed step size after the control duration.

In one embodiment, based on the step S103, when the actual power is greater than the target power, it is necessary to reduce the actual rotating speed through the rotating speed step size. When the actual power is less than the target power, it is necessary to increase the actual rotating speed through the rotating speed step size.

In one embodiment, the step S104 includes:
  When the actual power is greater than the target power, the actual rotating speed is reduced through the rotating speed step size, after the control duration;
  When the actual power is less than the target power, the actual rotating speed is increased through a rotating speed step size, after the control duration.

In one embodiment, after the actual rotating speed has been adjusted in this time, the steps S101-S104 are repeatedly performed, that is, the method for controlling the draught fan is repeatedly performed until the actual rotating speed remains constant, which lasts for a second preset time, the adjustment may be terminated. The second preset time may be set by the user according to the actual requirement by inputting the corresponding instruction through the human-machine interaction device of the draught fan device, or by sending the corresponding instruction to the draught fan device through the user terminal connected in communication with the draught fan device.

In one embodiment, after the step S104, the method further includes:
  the step S101 is performed again until the actual rotating speed remains constant, which lasts for the second preset time.

According to the embodiment shown in FIG. 1, the actual rotating speed of the draught fan may be adjusted by a certain control duration and a certain rotating speed step size according to the actual rotating speed, the actual power, and the target air volume without the need of mounting an anemometer and a static pressure sensor, which enables real-time dynamic adjustment of the air volume of the draught fan, to achieve the constant air volume control of the draught fan with low cost, high control accuracy, fast adjustment speed, and good stability.

In one embodiment, due to the fact that a small amount of experimental data has been used to determine the fitting equation related to power, speed and air volume, and the power coefficients corresponding to the multiple preset air volumes. Thus, the target power may also be obtained by a proportional interpolation method according to the powers corresponding to two preset air volumes that approximate to the target air volume.

Figure 2:
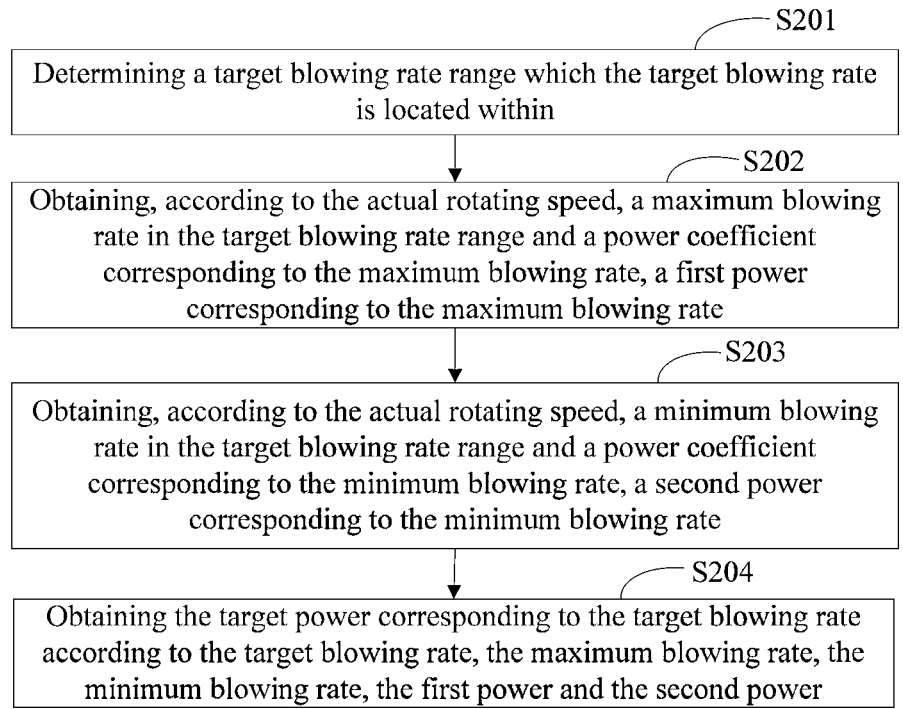
FIG. 2 illustrates a second schematic flow diagram of the method for controlling a draught fan according to another embodiment of the present application.

As shown in FIG. 2, in one embodiment, when the target power is obtained using the proportional interpolation method, the step S102 includes the following steps S201-S204:

In the step of S201, a target air volume range which the target air volume is located within is determined.

In one embodiment, all known preset air volumes may be divided into multiple air volume ranges, and the number of all air volume ranges is equal to the number of all preset air volumes minus one. The air volume ranges may be set by the user by inputting the corresponding instruction through the human-machine interaction device of the draught fan device, or by sending the corresponding instruction to the draught fan device through the user terminal connected in communication with the draught fan device, according to the actual requirement. The specific method for dividing the air volumes intervals may be implemented as sorting all preset air volumes in a descending order or in an ascending order, and using two adjacent preset air volumes in the obtained sorting intervals as the upper and lower limit values of one air volume range. For example, if five preset air volumes are sorted in the descending order as Q1, Q2, Q3, Q4, and Q5, the five preset air volumes may be divided into four intervals of [Q1, Q2), [Q2, Q3), [Q3, Q4), and [Q4, Q5).

In one embodiment, the target air volume may be compared with the upper and lower limit values of the air volume ranges to determine the target air volume range which the target air volume is located within (the target air volume range is one of all preset air volume ranges).

In one embodiment, the step S201 includes:

the target air volume is compared with the maximum and minimum air volumes of multiple different air volume ranges, respectively;

when the target air volume is greater than a minimum air volume of one air volume range and is less than or equal to a maximum air volume of the air volume range, this air volume range is determined as the target air volume range which the target air volume is located within.

In a step of S202, the first power corresponding to the maximum air volume is obtained according to the actual rotating speed, the maximum air volume in the target air volume range, and the power coefficient corresponding to the maximum air volume.

In one embodiment, after the target air volume range is determined, the power corresponding to the upper limit value may be calculated using the fitting equation according to the actual rotating speed, the upper limit value of the target air volume range (i.e. the maximum air volume) and the power coefficient corresponding to the upper limit value determined in advance through a small amount of experimental data. In particular, this power corresponding to the upper limit value is calculated by substituting the various parameters in the second formula with the actual rotating speed, the upper limit value of the target air volume range, and the power coefficient corresponding to the upper limit value.

In one embodiment, a calculation formula for the first power is listed below:

$$P1 = k11 * Q1 * V\_real + k12 * Q1^2 + k13 * V\_real^3$$

P1 represents the first power, V_real represents the actual rotating speed, Q1 represents the maximum air volume in the target air volume range, and k11, k12, and k13 are the power coefficients corresponding to the maximum air volume Q1.

In a step of S203, the second power corresponding to the minimum air volume is obtained according to the actual rotating speed, the minimum air volume in the target air volume range, and the power coefficient corresponding to the minimum air volume.

In one embodiment, based on the same calculation principle of the first power, after determining the target air volume range, the power coefficient corresponding to the lower limit value may be calculated by using a fitting equation according to the actual rotating speed, the lower limit value (i.e. the minimum air volume) of the target air volume range, and a small amount of experimental data. In particular, the parameters in the second formula is substituted with the actual rotating speed, the lower limit value of the target air volume range, and the power coefficient corresponding to the lower limit value.

In one embodiment, the calculation formula for the second power is:

$$P2 = k21 * Q2 * V\_real + k22 * Q2^2 + k23 * V\_real^3$$

P2 represents the second power, V_real represents the actual rotating speed, Q2 represents the minimum air volume in the target air volume range, and k21, k22, and k23 represent the power coefficients corresponding to the minimum air volume Q2.

In a step of S204, the target power corresponding to the target air volume is obtained according to the target air volume, the maximum air volume, the minimum air volume, the first power, and the second power.

In one embodiment, the target power can be obtained by using a proportional interpolation method after obtaining the first and second power.

In one embodiment, a calculation formula for the target power based on the proportional interpolation method is expressed as:

$$P\_ref = P2 + (P1 - P2) * (Q\_ref - Q2) / (Q1 - Q2)$$

P_ref represents the target power corresponding to the target air volume, Q_ref represents the target air volume, Q1 represents the maximum air volume, Q2 represents the minimum air volume, P1 represents the first power, and P2 represents the second power.

The following embodiments emphasize on the relational expression between the power, the air volume, and the speed of the draught fan under different preset air volumes, and the method for obtaining the power coefficients corresponding to the multiple preset air volumes.

Figure 3:
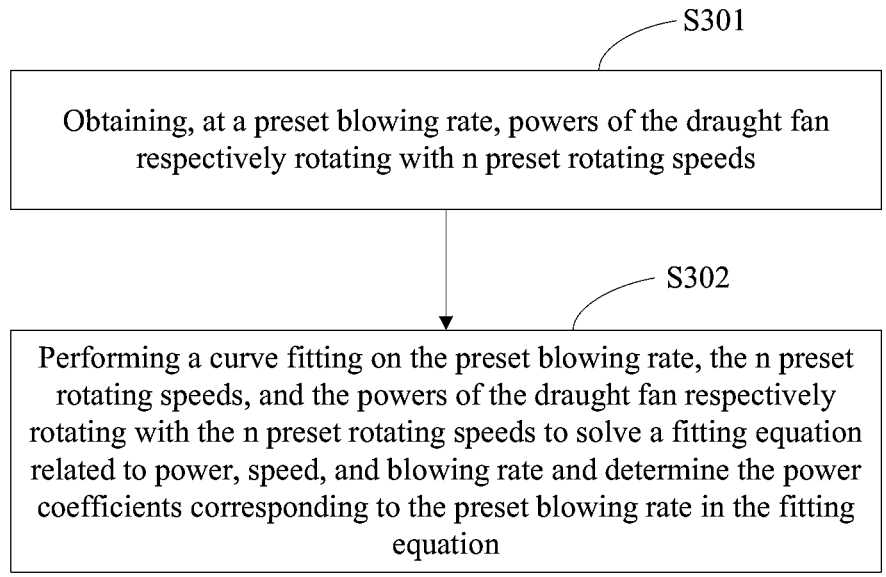
FIG. 3 illustrates a third schematic flow diagram of the method for controlling a draught fan according to yet another embodiment of the present application.

As shown in FIG. 3, in one embodiment, before the step S101, the following steps S301 and S302 are included:

In the step of S301, the powers of the draught fan respectively rotating with n preset rotating speeds at the preset air volume are obtained. Each preset rotating speed corresponds to one static pressure, n is an integer greater than or equal to 3.

In one embodiment, for each preset air volume, the powers of the draught fan at multiple preset rotating speeds corresponding to high, medium, and low static pressures may be obtained, respectively. Each static pressure includes at least one static pressure, and each static pressure corresponds to one preset rotating speed. In particular, for each preset air volume, the power of the draught fan rotating with at least one preset rotating speed corresponding to a high static pressure, the power of the draught fan rotating with at least one preset rotating speed corresponding to a medium static pressure, and the power of the draught fan rotating with at least one preset rotating speed corresponding to a low static pressure are obtained. That is, the powers of the draught fan rotating with at least three preset rotating speeds are obtained.

As shown in FIG. 4, FIG. 4 exemplarily illustrates the powers of the draught fan under three different preset air volumes (1620 m³/h, 1400 m³/h, and 1180 m³/h) and rotating with three preset rotating speeds corresponding to the three static pressures, respectively.

In one embodiment, a calculation formula for the powers of the draught fan rotating with the three preset rotating speeds is expressed as:

$$P = 1.5(Ud*Id + Uq*Iq) - 3*Rs*Is^2 \quad \text{(third formula)}$$

P represents the power of the draught fan rotating with one preset rotating speed, Ud represents a d-axis voltage of the draught fan rotating with the preset rotating speed, Uq represents a q-axis voltage of the draught fan rotating with the preset rotating speed, Id represents the d-axis current of the draught fan rotating with the preset rotating speed, Iq represents a q-axis current of the draught fan rotating with the preset rotating speed, Is represents a phase current of the draught fan rotating with the preset rotating speed, and Rs represents a phase resistance of the draught fan rotating with the preset rotating speed.

In one embodiment, the calculation formula for the power at the preset rotating speed is the third formula. When calculating the power of the draught fan rotating with the preset rotating speed, the power of the draught fan rotating with the preset rotating speed can be calculated only by using the third formula and according to the voltage, the current, the phase current, and the phase resistance of the draught fan rotating with the preset rotating speed.

In a step of S302, a curve fitting is performed on the preset air volume, the n preset rotating speeds, and the power of the draught fan rotating with the n preset rotating speeds to solve a fitting equation related to power, speed and air volume, and determine the power coefficients corresponding to the preset air volumes in the fitting equation.

In one embodiment, the fitting equation that reflects the relationship between power, speed, and air volume is established firstly during a development and measuring process. Then, the data (e.g., the data shown in FIG. 4) corresponding to the preset air volumes and obtained from pre-testing is substituted into the fitting equation to obtain sets of fitting equations corresponding to the preset air volumes, and a simultaneous solving is performed (i.e. a set of ternary linear equations are solved) to obtain the power coefficients corresponding to the preset air volumes. An internal storage space of a processor stores the preset air volumes and the corresponding power coefficients are pre-stored in an internal storage space of a processor, and a correspondence relationship between the preset air volumes and the corresponding power coefficients is established. The corresponding power coefficient in the internal storage space may be determined based on the preset air volume. The correspondence relationship may be a mapping relationship, and be presented in the form of a correspondence relationship table. The correspondence relationship table may be a look-up-table (Look-Up-Table, LUT), or be represented in the form of searching and outputting a corresponding search result through other input data. The draught fan device may also include a memory for equivalent replacing the internal storage space to achieve a data storage function. By calculating the power coefficients corresponding to the preset air volumes in advance during the development and testing phase, and writing the preset air volumes and the corresponding power coefficients into the correspondence relationship table, and the corresponding power coefficient can be directly searched and invoked from the correspondence relationship table according to the air volume during a constant air volume control process, without the need calculating the power coefficients online and in real-time. Thus, the computing resource and the execution time of the processor can be effectively saved.

In one embodiment, the fitting equation is expressed as:

$$P = k1*Q*V + k2*Q^2 + k3*V^3 \quad \text{(fourth formula)}$$

P represents the power of the draught fan rotating with a preset rotating speed V, Q represents the preset air volume, and k1, k2, and k3 represent the power coefficients corresponding to the preset air volume Q.

In one embodiment, the mathematical expression of the fitting equation is the fourth formula. When calculating the power coefficients corresponding to the preset air volumes, the power coefficients corresponding to the preset air volumes are calculated by using the fourth formula according to the preset rotating speed and the preset air volumes of the draught fan rotating with the preset air volumes.

As shown in FIG. 5, FIG. 5 exemplarily illustrates the power coefficients k1, k2, and k3 corresponding to the three different preset air volumes (1620 m³/h, 1400 m³/h, and 1180 m³/h).

In one embodiment, after obtaining the power coefficients corresponding to the preset air volumes, power-rotating speed curves of the draught fan rotating with the preset air volumes may be drawn.

Figures 6, 7:
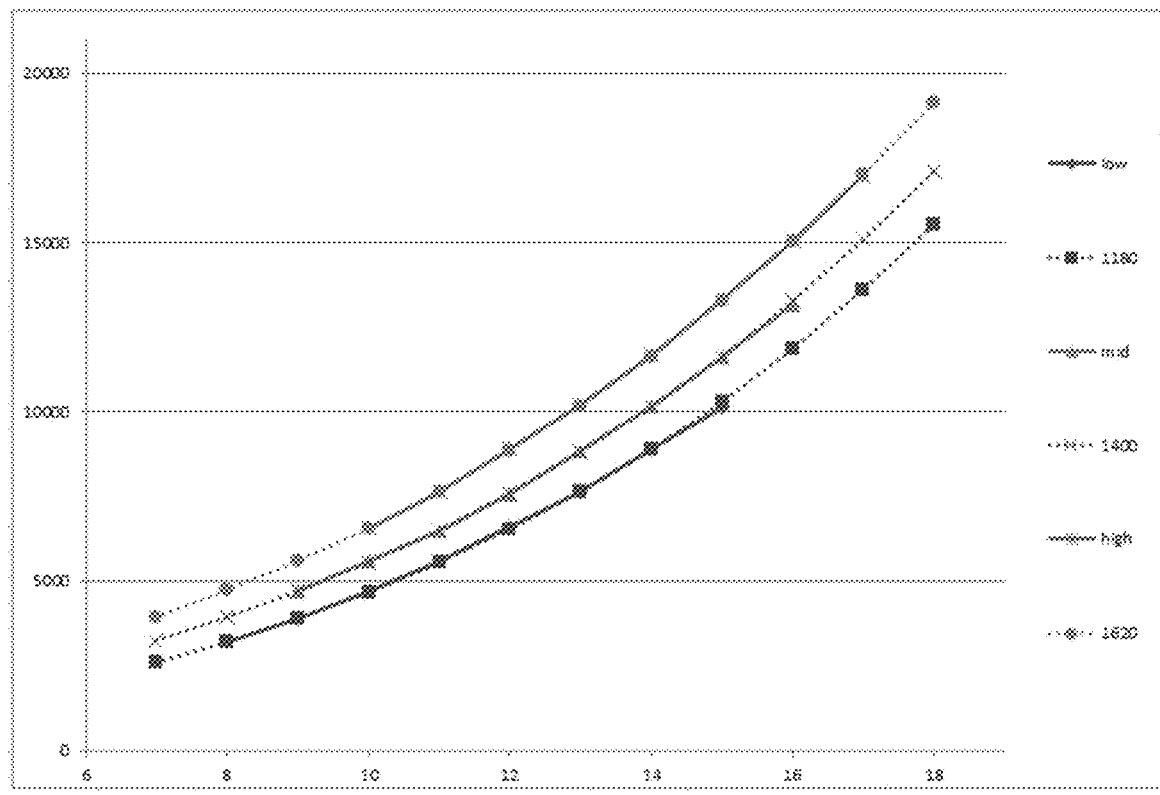
FIG. 6 illustrates three fitting curves corresponding to the three different preset air volumes according to one embodiment of the present application.
FIG. 7 illustrates accuracies of air volumes corresponding to the three different preset measurement air volumes according to one embodiment of the present application.

As shown in FIG. 6, FIG. 6 exemplarily illustrates three fitting curves corresponding to three different preset air volumes (1620 m³/h, 1400 m³/h, and 1180 m³/h) respectively. A horizontal axis represents a rotating speed in the device of 100 revolutions per minute (Revolutions Per Minute, RPM), a vertical axis represents the power in the device of 0.01 watts, low represents a low air volume of 1180 m³/h, mid represents a medium air volume of 1400 m³/h, and high represents a high air volume of 1620 m³/h.

It can be seen from FIG. 6 that, the fitting curve has a good fit, which indicates that the power coefficients k1-k3 at the three preset air volumes meet the requirement.

In one embodiment, after the power coefficient corresponding to the preset air volume is determined during the development and measuring process, the preset measurement air volume for measurement may also be sent to the draught fan. Then, the preset measurement static pressure for measurement may be controlled through an anemometer, and a constant air volume control may be performed on the draught fan using the same method as the method for controlling a draught fan described above. After performing of the constant air volume control is completed, the actually measured air volume of the draught fan measured at the preset measurement air volumes and the preset testing static pressures are obtained, and then an air volume accuracy is obtained based on the preset measurement air volume and the actually measured air volume. The air volume accuracy is equal to dividing of the difference value between the actually measured air volume and the preset measurement air volume by the preset measurement air volume.

In one embodiment, after the step S302, the method includes the following testing steps:
  obtaining the actually measured rotating speed and the actually measured power of the draught fan under the preset measurement air volume and the preset testing static pressure.
  obtaining the target test power corresponding to the preset measurement air volume based on the actually measured rotating speed and preset measurement air volume;
  obtaining the control duration and the rotating speed step size corresponding to the power difference when a power difference value between the actually measured power and the target test power is not within the initial difference value range;
  adjusting the actually measured rotating speed according to the rotating speed step size after the control duration;
  obtaining the actually measured power and the actually measured air volume of the draught fan;
  obtaining the air volume accuracy based on the preset measurement air volume and the actually measured air volume. The air volume accuracy is equal to dividing the difference value between the actually measured air volume and the preset measurement air volume by the preset measurement air volume.

In one embodiment, after obtaining the preset measurement air volume and the air volume accuracy under the preset measurement static pressure during the development and test process, the preset measurement static pressure may be changed and the aforesaid testing steps may be repeatedly performed to obtain the air volume accuracy of the draught fan under the same preset measurement air volume and the multiple different preset measurement static pressures. By changing the preset measurement air volume and repeatedly performing the step of obtaining the air volume accuracy of the draught fan under the same preset measurement air volume and the multiple different preset measurement static pressures, the multiple different preset measurement static pressures, and the air volume accuracies of the draught fan under the multiple different preset measurement air volumes, which correspond to the preset measurement air volumes, may be obtained. The preset measurement air volume may be set by the user according to the actual requirement by inputting the corresponding command through the human-machine interaction device of the draught fan device, or be set by sending the corresponding command to the draught fan device through the user terminal connected in communication to the draught fan device. As shown in FIG. 7, FIG. 7 exemplarily illustrates the air volume accuracies under the three different preset measurement air volumes (i.e., 1620 m$^3$/h, 1400 m$^3$/h, and 1180 m$^3$/h), which correspond to the three preset measurement air volumes.

It can be seen from FIG. 7 that, all constant air volume control accuracies under different preset measurement air volumes and different preset measurement static pressures are within 5%, which indicates that the method for controlling a draught fan may achieve a constant air volume control with high control accuracy.

Figure 8:
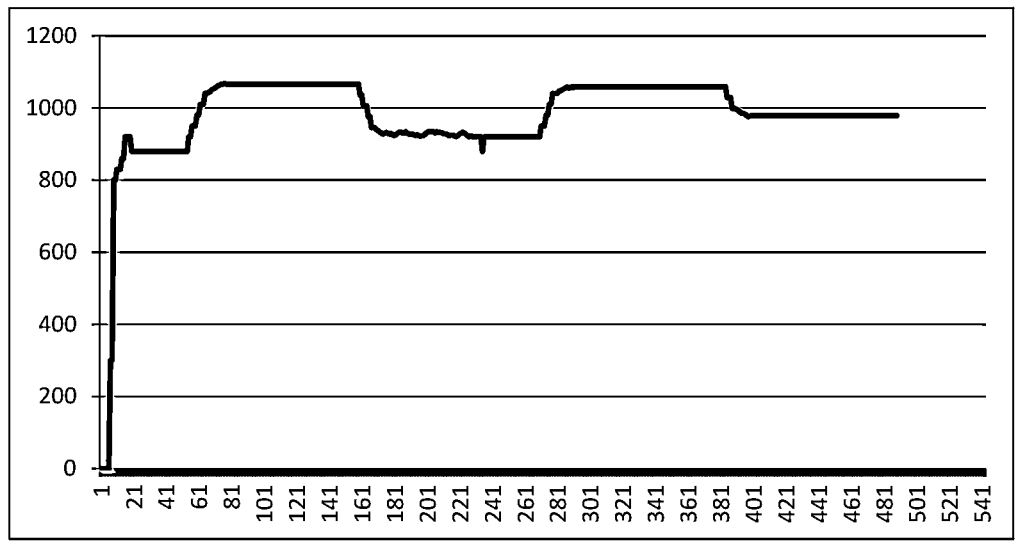
FIG. 8 illustrates a variation condition of the actually measured rotating speed during a measuring process according to one embodiment of the present application.

As shown in FIG. 8, FIG. 8 illustrates the variation of the actually measured rotating speed during the measuring process. Where, the vertical axis represents the actually measured rotating speed (in RPM), and the horizontal axis represents time. In the first stage, the draught fan is started with a preset measurement air volume of 750 m$^3$/h. After adjusting the actually measured rotating speed using the method for controlling a draught fan, the actually measured rotating speed was 880 RPM. In the second stage, some of the air inlet of the draught fan is blocked to reduce intake air. After adjusting the actually measured rotating speed using the method for controlling a draught fan, the actually measured rotating speed was 1066 RPM. In the third stage, intake air is added as compared to the second stage, the actually measured rotating speed was 920 RPM after adjusting the actually measured rotating speed by using the method for controlling a draught fan. In the fourth stage, intake air is reduced as compared to the third stage, the actually measured rotating speed was 1059 RPM after adjusting the actually measured rotating speed by using the method for controlling a draught fan. In the fifth stage, the intake air is added as compared to the fourth stage, and the actually measured rotating speed was 970 RPM after adjusting the actually measured rotating speed by using the method for controlling a draught fan.

It can be seen from FIG. 8 that a speed adjustment of the actual rotating speed of the draught fan is very fast (each digital quantity in the horizontal axis corresponds to a time of 3 seconds). For example, it takes 66 seconds to dynamically change from the first stage to the second stage, takes 45 seconds to dynamically change from the second stage to the third stage, takes 60 seconds to dynamically change from the third stage to the fourth stage and become stabilized, and takes 42 seconds to dynamically change from the fourth stage to the fifth stage and become stabilized. The adjustment of the actual rotating speed is very stable, over adjustment or overshoot does not occur almost, the speed and the smoothness of the adjustment of the air volume are taken into account.

It should be understood that, the values of serial numbers of the steps in the aforesaid embodiments do not indicate an order of execution sequences of the steps; instead, the execution sequences of the steps should be determined by functionalities and internal logic of the steps, and thus shouldn't be regarded as limitation to implementation processes of the embodiments of the present application.

Figure 9:
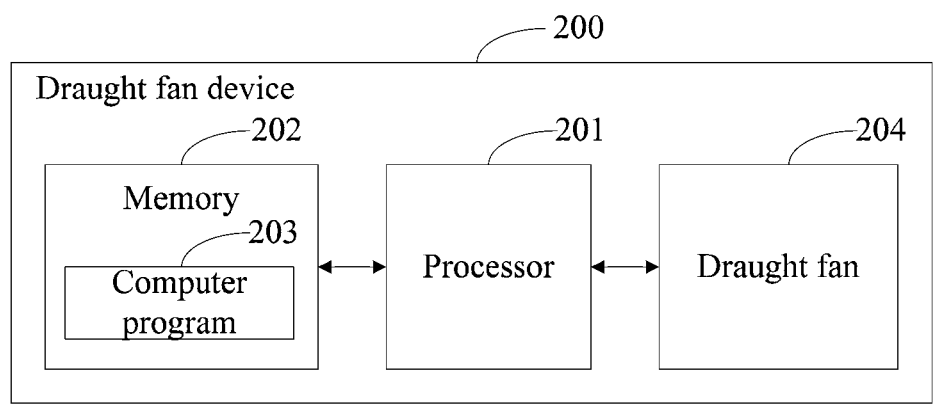
FIG. 9 illustrates a schematic structural diagram of a draught fan device according to one embodiment of the present application.
Figure 10:
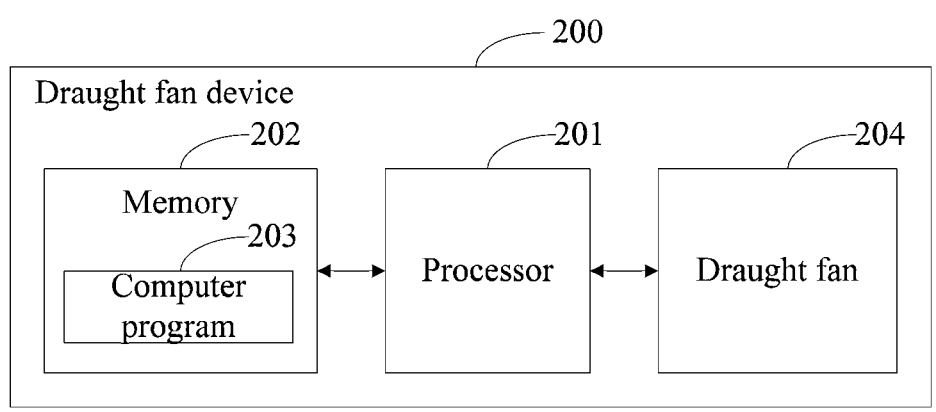

As shown in FIG. 9, a draught fan device 200 is further provided in the embodiments of the present application. The draught fan device 200 includes at least one processor 201 (only one processor is shown in FIG. 9), a memory 202, and a computer program 203 stored in the memory 202 and executable by the at least one processor 201. The steps of implementing the method embodiments when the computer program 203 is executed by the processor 201 of the draught fan device 204 are further included.

In one embodiment, the draught fan device may include but is not limited to a draught fan, a memory, a processor, etc. In one embodiment, FIG. 9 is only one example of the draught fan device 5, but should not be constituted as limitation to the draught fan device 5. More or less components than the components shown in FIG. 9 may be included. In one embodiment, some components or different components may be combined. For example, the draught fan device may also include an input and output device, a network access device, etc. The input and output device may include the aforesaid man-machine interaction device, and may also include a display screen for displaying the operating parameters of the draught fan device. The network access device may include a communication device for communicating the draught fan device with the aforesaid user terminal.

In one embodiment, the processor may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, in one embodiment, the processor can also be any conventional processor, or the like.

In some embodiments, the memory may be an internal storage device of the draught fan device, such as a hard disk or a memory of the draught fan device. The memory may also be an external storage device of the draught fan device, such as a plug-in hard disk, a SMC (Smart Media Card), a SD (Secure Digital) card, a FC (Flash Card) equipped on the draught fan device. Furthermore, the memory may not only include the internal storage device of the draught fan device, but also include the external memory of the draught fan device. The memory is configured to store an operating system, an application program, a boot loader, data and other procedures such as program codes of the computer program. The memory may also be configured to store data that has been output or being ready to be output temporarily.

In one embodiment, the display may be a thin film transistor liquid crystal display (TFT-LCD), a liquid crystal display (LCD), an organic liquid crystal display (OLED), a quantum dot light emitting diode (QLED), a seven segment nixie tube or an eight segment nixie tube, etc.

In one embodiment, the communication device may be arranged as any device that can directly or indirectly communicate with the user terminal in the manner of a long-distance wired or wireless communication according to the actual requirement. For example, the communication device may provide communication solutions applied to network devices, including wireless local area networks (WLAN) (e.g., Wi-Fi network), Bluetooth, Zigbee, mobile communication network, global navigation satellite system (GNSS), frequency modulation (FM), near field communication (NFC), Infrared (IR). The communication device may include an antenna. The antenna can only have one element, or be an antenna array including multiple elements. The communication device may receive electromagnetic waves through the antenna, modulate and filter the electromagnetic wave signal, and send the processed signal to the processor. The communication device may also receive a signal to be sent from the processor, modulate and amplify the signal to be sent and convert it into an electromagnetic wave, and emit the electromagnetic wave through the antenna.

A non-transitory computer-readable storage medium is further provided in one embodiment of the present application. The non-transitory computer-readable storage medium stores a computer program, that, when executed by the processor, causes the processor to implement the steps in the various method embodiments.

A computer program product is further provided in one embodiment of the present application. When the computer program product is executed by the draught fan device, the draught fan device is caused to implement the steps in the various method embodiments.

The computer readable medium may at least include: any physical equipment or device that can carry the computer program codes, recording medium, USB flash disk, mobile hard disk, hard disk, optical disk, computer memory, read-only memory (ROM), random access memory (RAM), and software distribution medium, such as universal serial bus (USB) flash disk, mobile hard disk drive, diskette or optical disk.

In the embodiments of the present application, the descriptions of the embodiments in the present application are emphasized respectively, regarding the part in some embodiments which is not described in detail, reference can be made to related descriptions in other embodiments.

The aforesaid embodiments are merely used to illustrate the embodiments of the present disclosure, rather than limiting the embodiments of the present disclosure. Although the present application has been described in detail with reference to the embodiments described above, these embodiments may still be modified; some or all the embodiments may be equivalently replaced. However, these modifications or replacements do not make the essences of corresponding embodiments to break away from the spirit and the scope of the embodiments of the present application, and should all be included in the protection scope of the present application.

What is claimed is:

1. A method for controlling a draught fan performed by a draught fan device, comprising:
    obtaining an actual rotating speed, an actual power, and a target air volume of the draught fan;
    obtaining a target power corresponding to the target air volume according to the actual rotating speed and the target air volume;
    obtaining, in response to a power difference value between the actual power and the target power being not within an initial difference value range, a control duration and a rotating speed step size corresponding to the power difference value; and
    adjusting the actual rotating speed according to the rotating speed step size, after the control duration.

2. The method according to claim 1, wherein said obtaining the target power corresponding to the target air volume according to the actual rotating speed and the target air volume comprises:
    determining a target air volume range which the target air volume is located within;
    obtaining, according to the actual rotating speed, a maximum air volume in the target air volume range and a power coefficient corresponding to the maximum air volume, a first power corresponding to the maximum air volume;
    obtaining, according to the actual rotating speed, a minimum air volume in the target air volume range and a power coefficient corresponding to the minimum air volume, a second power corresponding to the minimum air volume; and
    obtaining the target power corresponding to the target air volume according to the target air volume, the maximum air volume, the minimum air volume, the first power and the second power.

3. The method according to claim 2, wherein said obtaining the target power corresponding to the target air volume according to the target air volume, the maximum air volume, the minimum air volume, the first power and the second power comprises:
    obtaining, using a proportional interpolation method, the target power corresponding to the target air volume according to the target air volume, the maximum air volume, the minimum air volume, the first power, and the second power.

4. The method according to claim 3, wherein a calculation formula of the target power is expressed as:

$$P\_ref = P2 + (P1-P2)*(Q\_ref-Q2)/(Q1-Q2);$$

wherein, P_ref represents the target power corresponding to the target air volume, Q_ref represents the target air volume, Q1 represents the maximum air volume, Q2 represents the minimum air volume, P1 represents the first power, and P2 represents the second power.

5. The method according to any claim 2, wherein before said obtaining the actual rotating speed, the actual power, and the target air volume of the draught fan, the method further comprises:
    obtaining, at a preset air volume, powers of the draught fan respectively rotating with n preset rotating speeds; wherein each of the n preset rotating speeds corresponds to a static pressure, and n is an integer greater than or equal to 3; and
    performing a curve fitting on the preset air volume, the n preset rotating speeds, and the powers of the draught fan respectively rotating with the n preset rotating speeds to solve a fitting equation related to power, speed, and air volume and determine power coefficients corresponding to the preset air volume in the fitting equation.

6. The method according to claim 5, wherein said obtaining the powers of the draught fan respectively rotating with the n preset rotating speeds at the preset air volume comprises:
    obtaining a d-axis voltage, a q-axis voltage, a d-axis current, a q-axis current, a phase current, and a phase resistance of the draught fan respectively rotating with the n preset rotating speeds under the preset air volume; and
    obtaining the powers of the draught fan rotating with the n preset rotating speeds respectively based on the d-axis voltage, the q-axis voltage, the d-axis current, the q-axis current, the phase current, and the phase resistance of the draught fan rotating with the n preset rotating speeds respectively.

7. The method according to claim 6, wherein a calculation formula of the powers of the draught fan at the n preset rotating speeds is expressed as:

$$P=1.5(Ud*Id+Uq*Iq)-3*Rs*Is^2;$$

wherein, P represents a power of the draught fan rotating with a preset rotating speed, Ud represents the d-axis voltage of the draught fan rotating with the preset rotating speed, Uq represents the q-axis voltage of the draught fan rotating with the preset rotating speed, Id represents the d-axis current of the draught fan rotating with the preset rotating speed, Iq represents the q-axis current of the draught fan rotating with the preset rotating speed, Is represents the phase current of the draught fan rotating with the preset rotating speed, and Rs represents the phase resistance of the draught fan rotating with the preset rotating speed.

8. The method according to claim 5, wherein the fitting equation is expressed as:

$$P=k1*Q*V+k2*Q2+k3*V^3;$$

wherein, P represents a power of the draught fan rotating with a preset rotating speed V, Q represents the preset air volume, k1, k2, and k3 represent the power coefficients corresponding to the preset air volume Q.

9. A draught fan device, comprising a draught fan, a memory, a processor, and a computer program stored in the memory and executable by the processor; wherein the processor is configured to implement, when executing the computer program, cause the processor to:
obtain an actual rotating speed, an actual power, and a target air volume of the draught fan;
obtain a target power corresponding to the target air volume according to the actual rotating speed and the target air volume;
obtain, in response to a power difference value between the actual power and the target power being not within an initial difference value range, a control duration and a rotating speed step size corresponding to the power difference value, and
adjusting actual rotating speed according to the rotating speed step size, after the control duration.

10. The draught fan device according to claim 9, wherein said obtaining the target power corresponding to the target air volume according to the actual rotating speed and the target air volume comprises:
determining a target air volume range which the target air volume is located within;
obtaining, according to the actual rotating speed, a maximum air volume in the target air volume range and a power coefficient corresponding to the maximum air volume, a first power corresponding to the maximum air volume;
obtaining, according to the actual rotating speed, a minimum air volume in the target air volume range and a power coefficient corresponding to the minimum air volume, a second power corresponding to the minimum air volume; and
obtaining the target power corresponding to the target air volume according to the target air volume, the maximum air volume, the minimum air volume, the first power and the second power.

11. The draught fan device according to claim 10, wherein said obtaining the target power corresponding to the target air volume according to the target air volume, the maximum air volume, the minimum air volume, the first power and the second power comprises:
obtaining, using a proportional interpolation method, the target power corresponding to the target air volume according to the target air volume, the maximum air volume, the minimum air volume, the first power, and the second power.

12. A non-transitory computer-readable storage medium, which stores a computer program, that, when executed by a processor of a draught fan device, causes the processor of the draught fan device to:
obtain an actual rotating speed, an actual power, and a target air volume of the draught fan;
obtain a target power corresponding to the target air volume according to the actual rotating speed and the target air volume;
obtain, in response to a power difference value between the actual power and the target power being not within an initial difference value range, a control duration and a rotating speed step size corresponding to the power difference value; and
adjust the actual rotating speed according to the rotating speed step size, after the control duration.

13. The non-transitory computer-readable storage medium according to claim 12, wherein said obtaining the target power corresponding to the target air volume according to the actual rotating speed and the target air volume comprises:
determining a target air volume range which the target air volume is located within;
obtaining, according to the actual rotating speed, a maximum air volume in the target air volume range and a power coefficient corresponding to the maximum air volume, a first power corresponding to the maximum air volume;
obtaining, according to the actual rotating speed, a minimum air volume in the target air volume range and a power coefficient corresponding to the minimum air volume, a second power corresponding to the minimum air volume; and
obtaining the target power corresponding to the target air volume according to the target air volume, the maximum air volume, the minimum air volume, the first power and the second power.

14. The non-transitory computer-readable storage medium according to claim 13, wherein said obtaining the target power corresponding to the target air volume according to the target air volume, the maximum air volume, the minimum air volume, the first power and the second power comprises:
obtaining, using a proportional interpolation method, the target power corresponding to the target air volume according to the target air volume, the maximum air volume, the minimum air volume, the first power, and the second power.

15. The non-transitory computer-readable storage medium according to claim 14, wherein a calculation formula of the target power is expressed as:

$$P\_ref=P2+(P1-P2)*(Q\_ref-Q2)/(Q1-Q2);$$

wherein, P_ref represents the target power corresponding to the target air volume, Q_ref represents the target air volume, Q1 represents the maximum air volume, Q2 represents the minimum air volume, P1 represents the first power, and P2 represents the second power.

16. The non-transitory computer-readable storage medium according to claim 13, wherein before said obtaining the actual rotating speed, the actual power, and the target air volume of the draught fan, wherein the processor of the draught fan device is further caused to:

obtain, at a preset air volume, powers of the draught fan respectively rotating with n preset rotating speeds; wherein each of the n preset rotating speeds corresponds to a static pressure, and n is an integer greater than or equal to 3; and perform a curve fitting on the preset air volume, the n preset rotating speeds, and the powers of the draught fan respectively rotating with the n preset rotating speeds to solve a fitting equation related to power, speed, and air volume and determine the power coefficients corresponding to the preset air volume in the fitting equation.

17. The non-transitory computer-readable storage medium according to claim 16, wherein said obtaining the powers of the draught fan respectively rotating with the n preset rotating speeds at the preset air volume comprises:

obtaining a d-axis voltage, a q-axis voltage, a d-axis current, a q-axis current, a phase current, and a phase resistance of the draught fan respectively rotating with the n preset rotating speeds under the preset air volume; and obtaining the powers of the draught fan rotating with the n preset rotating speeds respectively based on the d-axis voltage, the q-axis voltage, the d-axis current, the q-axis current, the phase current, and the phase resistance of the draught fan rotating with the n preset rotating speeds respectively.

18. The non-transitory computer-readable storage medium according to claim 17, wherein a calculation formula of the powers of the draught fan at the n preset rotating speeds is expressed as:

$$P=1.5(Ud*Id+Uq*Iq)-3*Rs*Is^2;$$

wherein, P represents a power of the draught fan rotating with a preset rotating speed, Ud represents the d-axis voltage of the draught fan rotating with the preset rotating speed, Uq represents the q-axis voltage of the draught fan rotating with the preset rotating speed, Id represents the d-axis current of the draught fan rotating with the preset rotating speed, Iq represents the q-axis current of the draught fan rotating with the preset rotating speed, Is represents the phase current of the draught fan rotating with the preset rotating speed, and Rs represents the phase resistance of the draught fan rotating with the preset rotating speed.

19. The non-transitory computer-readable storage medium according to claim 16, wherein the fitting equation is expressed as:

$$P=k1*Q*V+k2*Q^2+k3*V^3;$$

wherein, P represents a power of the draught fan rotating with a preset rotating speed V, Q represents the preset air volume, k1, k2, and k3 represent the power coefficients corresponding to the preset air volume Q.

* * * * *